United States Patent
Ko

(10) Patent No.: US 7,366,197 B2
(45) Date of Patent: Apr. 29, 2008

(54) METHOD AND APPARATUS FOR ADAPTING GBIC MODULE TO COUPLED ETHERNET SWITCH CAPABLE OF OUTPUTTING DIFFERENT VOLTAGES

(75) Inventor: Chi Yung Ko, Hsinchu (TW)

(73) Assignee: D-Link Corporation, Hsinchu (TW)

( * ) Notice: Subject to any disclaimer, the term of this patent is extended or adjusted under 35 U.S.C. 154(b) by 939 days.

(21) Appl. No.: 10/704,797

(22) Filed: Nov. 12, 2003

(65) Prior Publication Data

US 2005/0100007 A1    May 12, 2005

(51) Int. Cl.
*H04J 3/22* (2006.01)
*H04J 14/02* (2006.01)

(52) U.S. Cl. .................... 370/463; 370/465; 398/94

(58) Field of Classification Search ........ 370/465–467, 370/463, 469; 398/94, 197; 326/80
See application file for complete search history.

(56) References Cited

U.S. PATENT DOCUMENTS 6,418,121 B1 * 7/2002 Flickinger et al. .......... 370/242
6,483,806 B1 * 11/2002 Flickinger et al. .......... 370/235
6,607,307 B2 * 8/2003 Gilliland et al. ............. 385/88

* cited by examiner

*Primary Examiner*—Chi Pham
*Assistant Examiner*—Tri H. Phan
(74) *Attorney, Agent, or Firm*—Bacon & Thomas, PLC

(57) ABSTRACT

The present invention is to provide method and apparatus for adapting a GBIC module to an Ethernet switch capable of outputting one of different voltages in which in a case of the GBIC module coupled to the Ethernet switch, a DC converter of the GBIC module is adapted to lower an input voltage thereof supplied by the Ethernet switch prior to boosting the lowered voltage to an operating voltage required by a GBIC logic circuit of the GBIC module without confirming whether the input voltage has the same value as the operating voltage. Thus, the present invention can prevent the GBIC module from not working due to low input voltage or being damaged due to high current when the GBIC module is coupled to the Ethernet switch.

10 Claims, 3 Drawing Sheets

US 7,366,197 B2

METHOD AND APPARATUS FOR ADAPTING GBIC MODULE TO COUPLED ETHERNET SWITCH CAPABLE OF OUTPUTTING DIFFERENT VOLTAGES

FIELD OF THE INVENTION

The present invention relates to Ethernet and more particularly to method and apparatus for adapting a GBIC module to a coupled Ethernet switch capable of outputting different voltages.

BACKGROUND OF THE INVENTION

Ethernet has characteristics of high data transfer rate and high adaptability. Also, the establishment of Ethernet can boost domestic economy and enable ISPs (Internet Service Providers) to integrate network technology. In terms of cost and technology, the conventional ATM (Asynchronous Transfer Mode) is complicated and high in cost. Thus, its market share is lowered significantly. Fortunately, Gigabit Ethernet is emerging as complimentary means. Gigabit Ethernet has a transfer distance up to 150 km. Also, Gigabit Ethernet can be combined with fiber optics for extending its application to LAN (local area network) and MAN (metropolitan area network).

Moreover, advantages including flexible bandwidth management, reduced complication of the Internet, supporting wideband service of high capacity, and provision of diversified, substantial, and high value-added telecommunication services to ISPs and companies are made possible by Ethernet. Thus, as viewed by companies, Ethernet, as a novel, advanced network, has benefits of being simple, low cost, powerful, and high bandwidth. Also, Ethernet can lift the limitation caused by complicated, fixed infrastructure and WAN (wide area network) connection. As viewed by ISPs, the high bandwidth of Ethernet can provide more value-added services to end users, resulting in an increase of service quality.

Gigabit Ethernet, also called 1000Base-T, is a branch of Ethernet. The difference between Gigabit Ethernet and Ethernet is that the former has a data transfer rate of 1,000 Megabits, i.e., 10 times of 100Base-T. A standard Gigabit Ethernet called IEEE802.3z was published in 1998. But 1000Base-T standard (i.e., Gigabit Ethernet complied with IEEE 802.3 using category 5 (CAT-5) copper wire) was formally approved in 1999. Such standard makes Gigabit Ethernet available other than server room and trunk room. Hopefully, Gigabit Ethernet will be as popular as 10/100 Ethernet in a near future. 802.3z Gigabit Ethernet operates well, has a speed of 10 times as that of 100Base-T, and is capable of operating in various environments. Further, 1000Base-T has a rearward adaptability and is adapted to cooperate with 10/100 Ethernet. Furthermore, 1000Base-T uses CAT-5 wire or even higher.

A prior connection of an Ethernet switch 3 and a GBIC (Gigabit Interface Converter) module 4 is shown in FIG. 1. As shown, the Ethernet switch 3 comprises a GBIC interface connector (GBIC I/F) 31 coupled to the GBIC module 4 so that the Ethernet switch 3 is able to provide one of two operating voltages (specifically, DC voltages in the following description) to the GBIC module 4 via the GBIC I/F 31 as detailed below.

(1) The Ethernet switch 3 is able to provide 5V voltage to the GBIC module 4 in a first case in which 5V voltage is fed to a GBIC logic circuit 41 and 5V voltage is used by the GBIC module 4. Alternatively, a GBIC power circuit 42 is responsible for lowering 5V voltage as 3.3 V, 2.5V, or 1.8V voltage prior to feeding to the GBIC logic circuit 41 and being used by the GBIC module 4.

(2) The Ethernet switch 3 is able to provide 3.3V voltage to the GBIC module 4 in a second case in which 3.3V voltage is fed to the GBIC logic circuit 41 and 3.3V voltage is used by the GBIC module 4. Alternatively, the GBIC power circuit 42 is responsible for lowering 3.3V voltage as 2.5V or 1.8V voltage prior to feeding to the GBIC logic circuit 41 and being used by the GBIC module 4.

In view of the above, a user has to check voltage at the GBIC I/F 31 in order to confirm whether the voltage is the one required by the GBIC module 4 prior to connecting the GBIC module 4 and the Ethernet switch 3 together at the GBIC I/F 31. Otherwise, two undesired conditions may occur.

(1) The output voltage of the GBIC module 4 will be less than the input voltage thereof when the GBIC module 4 is used to step down voltage. For example, voltage applied to the GBIC logic circuit 41 will be too low if the input voltage of the GBIC module 4 measured at the GBIC I/F 31 is 3.3 V.

(2) Voltage applied to the GBIC logic circuit 41 is 5V as measured at the GBIC I/F 31 while the operating voltage of the GBIC module 4 is 3.3 V. As an end, the GBIC logic circuit 41 will be damaged due to too much current.

Thus, it is desirable among consumers and Ethernet switch 3 manufacturers to provide means for adapting a GBIC module 4 to an Ethernet switch 3 capable of outputting different voltages when the GBIC module 4 is coupled to the Ethernet switch 3 in order to overcome the above drawbacks (e.g., voltage of the GBIC logic circuit 41 being too low or the GBIC logic circuit 41 being damaged) of the prior art.

SUMMARY OF THE INVENTION

A primary object of the present invention is to provide method and apparatus for adapting a GBIC module to an Ethernet switch capable of outputting one of different voltages in which in a case of the GBIC module coupled to the Ethernet switch, a DC converter of the GBIC module is adapted to lower an input voltage thereof supplied by the Ethernet switch prior to boosting the lowered voltage to an operating voltage required by a GBIC logic circuit of the GBIC module without confirming whether the input voltage has the same value as the operating voltage. By utilizing the present invention, the above drawbacks of the prior art including the input voltage being too low to be operable or electronic components of the GBIC module being damaged due to too much current when the GBIC module is coupled to the Ethernet switch can be overcome.

The above and other objects, features and advantages of the present invention will become apparent from the following detailed description taken with the accompanying drawings.

DETAILED DESCRIPTION OF THE PREFERRED EMBODIMENTS

Figure 1:
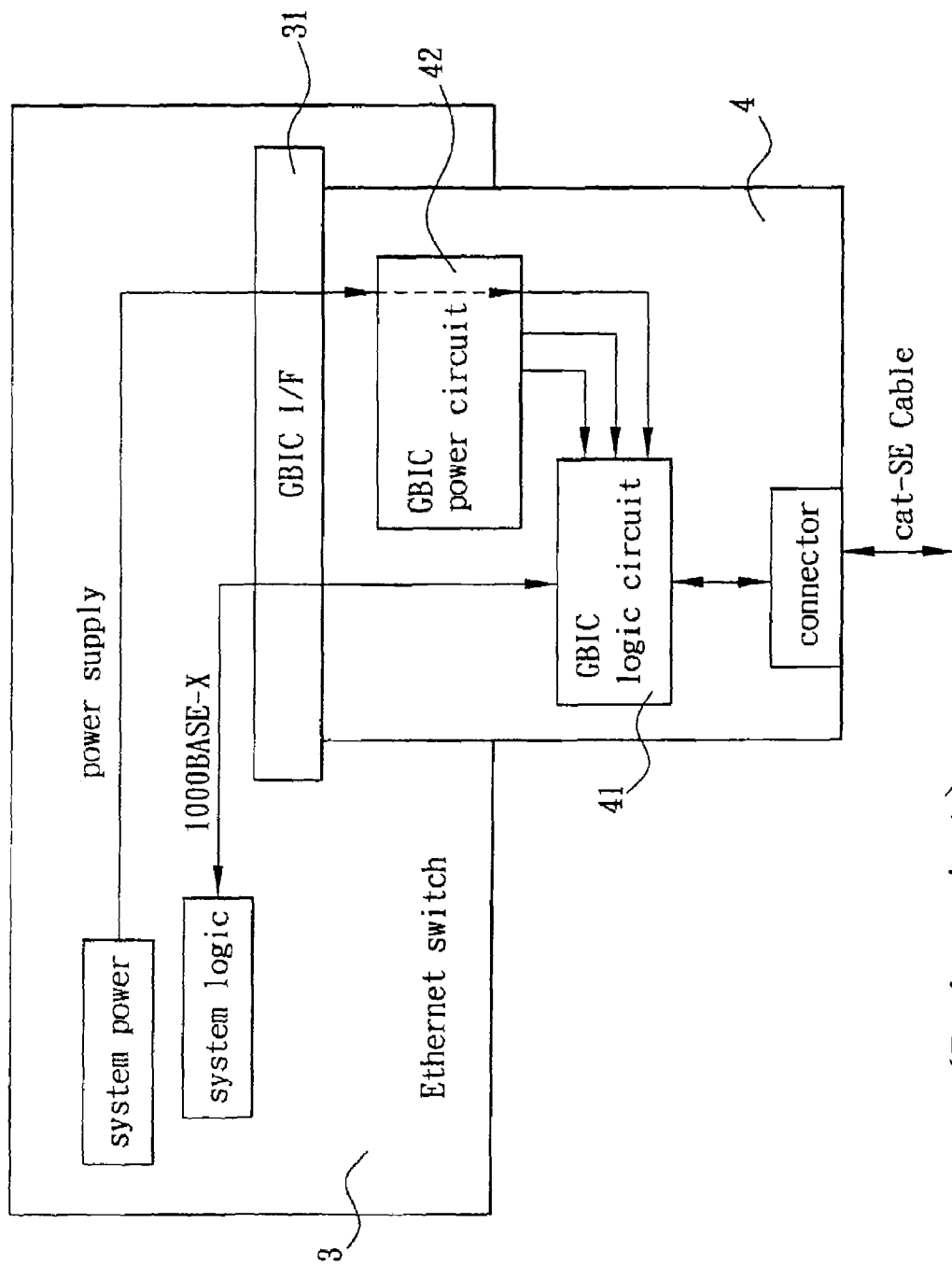
FIG. 1 presents schematically the connection of a conventional GBIC module to a coupled Ethernet switch capable of outputting different voltages.
Figure 2:
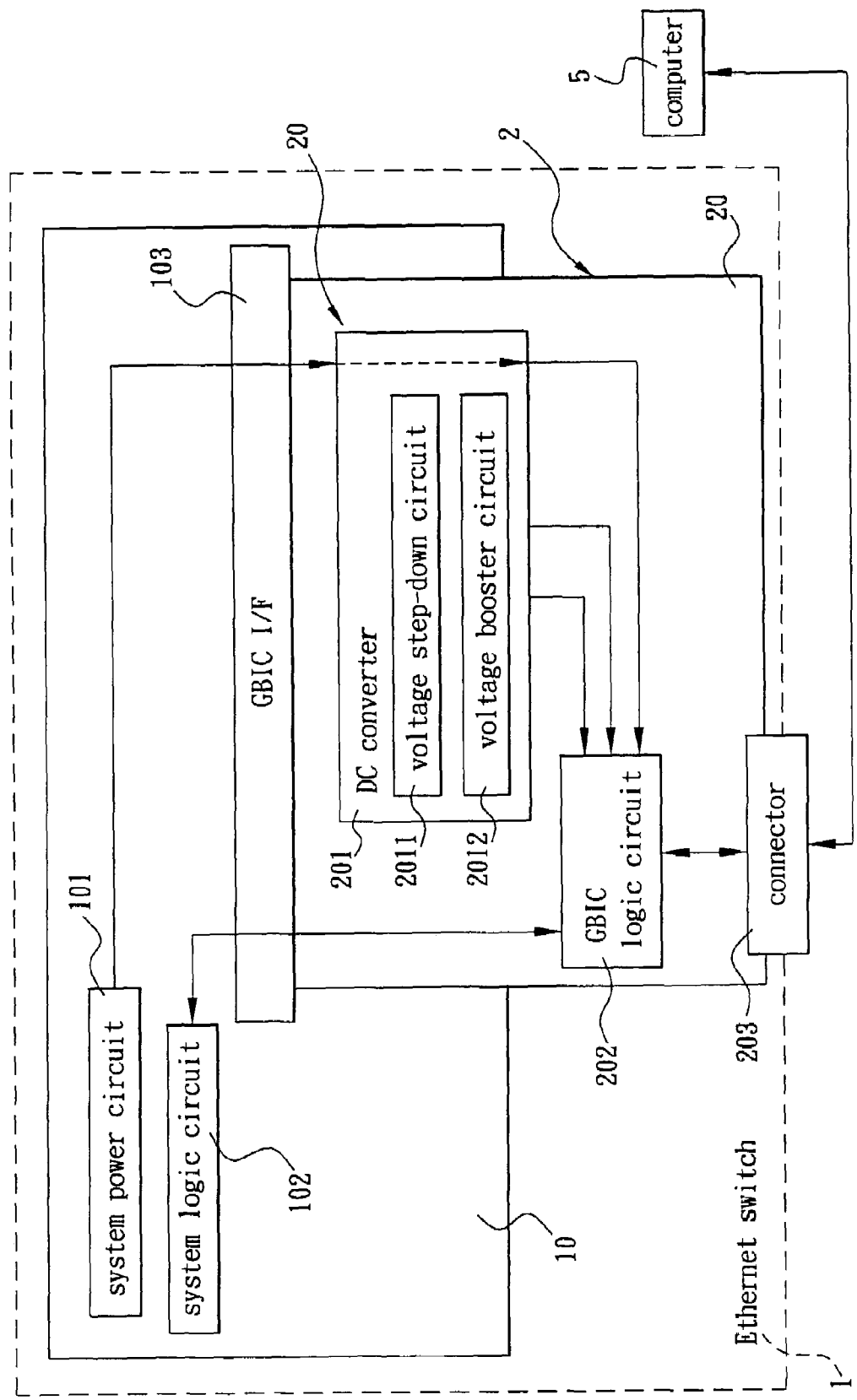
FIG. 2 presents schematically the connection of a GBIC module of the invention to a coupled Ethernet switch capable of outputting different voltages.

The invention is directed to method and apparatus for adapting a GBIC module to a coupled Ethernet switch capable of outputting different voltages as illustrated in FIG. 2. The method is carried out between an Ethernet switch 1 and a GBIC module 2. The GBIC module 2 comprises a DC converter 201 for lowering an operating voltage (or called input voltage) (e.g., in a range from 2.7V to 6.0V) from the Ethernet switch 1 to a plurality of low voltages in which one the voltages is then boosted to an operating voltage of the GBIC module 2. Hence, the GBIC module 2 is readily adapted to connect to the Ethernet switch 1 by utilizing the invention even as the Ethernet switch 1 is able to output one of two different voltages (e.g., 3.3V or 5V). In other words, it is contemplated by the invention that there is no need to worry that voltage fed from the GBIC module 2 to the Ethernet switch 1 may be too low to be operable or may damage electronic components of the GBIC module 2 due to too much current.

Figure 3:
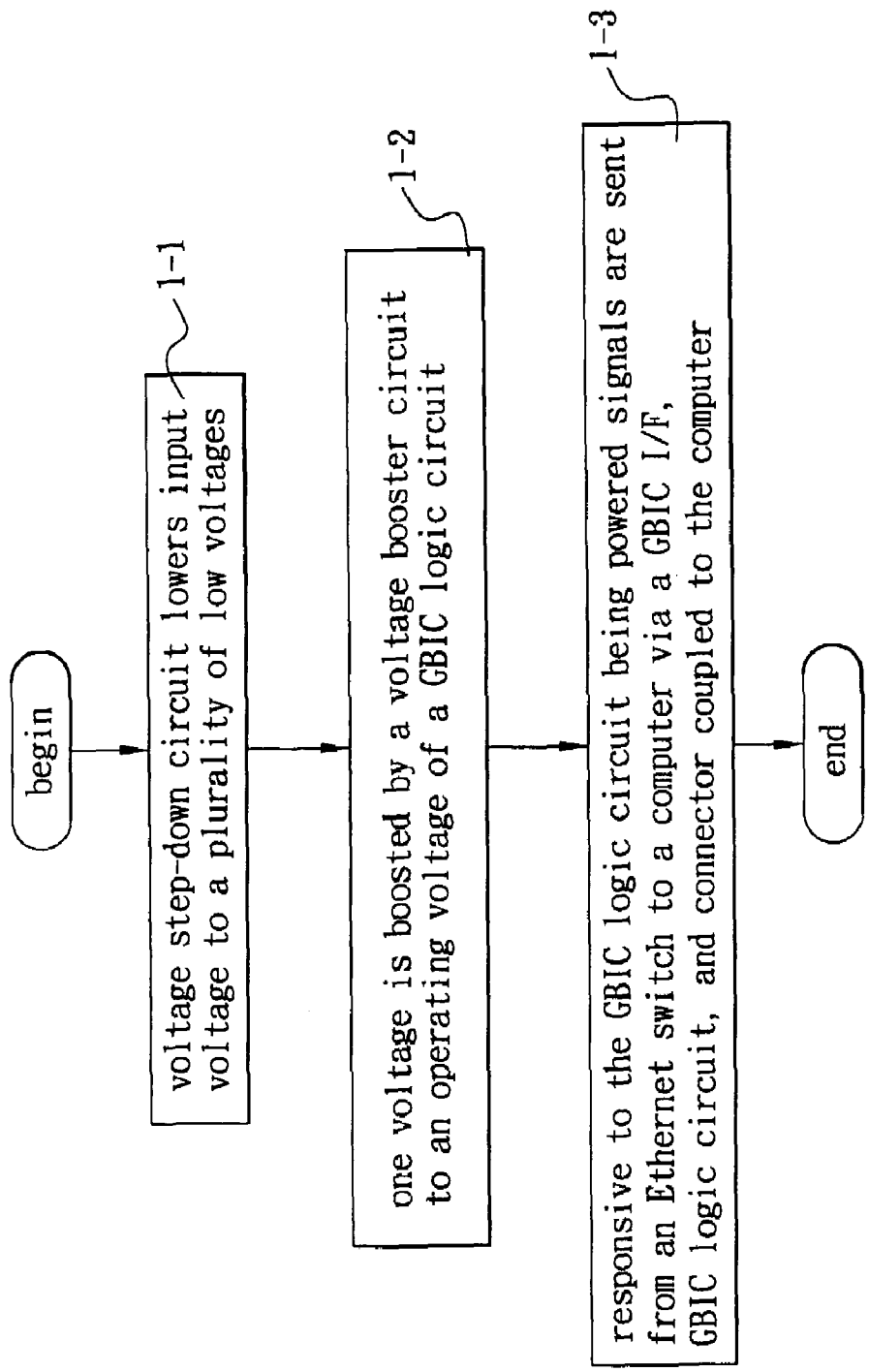
FIG. 3 is a flow chart diagram of the invention.

Referring to FIGS. 2 and 3, in the invention the Ethernet switch 1 comprises a circuit board 10. On the circuit board 10 there are provided a system power circuit 101, a system logic circuit 102, and a GBIC I/F 103. An operating voltage from the system power circuit 101 is applied to the GBIC I/F 103. The system logic circuit 102 is used to send signals received from the Ethernet switch 1 to the GBIC I/F 103.

As shown in FIGS. 2 and 3, the GBIC module 2 comprises a substrate 20. On the substrate 20 there are provided a DC converter 201, a GBIC logic circuit 202, and a connector 203. The DC converter 201 comprises a voltage step-down circuit 2011 and a voltage booster circuit 2012. The DC converter 201 is used to supply power to the GBIC logic circuit 202 in operation.

As shown in FIGS. 2 and 3, the GBIC module 2 is first coupled to the GBIC I/F 103. Next, as best illustrated in FIG. 3, the DC converter 201 is adapted to convert the operating voltage supplied by the Ethernet switch 1 into an operating voltage required by the GBIC logic circuit 202 by performing the following steps:

The voltage step-down circuit 2011 lowers the input voltage to a plurality of low voltages (step 1-1). Next, one of the voltages is boosted by the voltage booster circuit 2012 to an operating voltage of the GBIC logic circuit 202 (step 1-2). Finally, responsive to the GBIC logic circuit 202 being powered signals are sent from the Ethernet switch 1 to a computer 5 via the GBIC I/F 103, the GBIC logic circuit 202, and the connector 203 coupled to the computer 5 (step 1-3).

For better understanding of the invention, an exemplary example is described below. It is assumed that an input voltage of the GBIC module 2 from the GBIC I/F 103 of the Ethernet switch 1 is 5V and the operating voltage of the GBIC module 2 held by a user is 3.3V. At this moment, the user does not need to confirm whether the input voltage of the GBIC module 2 from the GBIC I/F 103 has the same value as the required operating voltage of the GBIC module 2. Hence, the user can connect the GBIC module 2 to the GBIC I/F 103. At this time, the voltage step-down circuit 2011 is used to lower 5V to 2.5V and 1.8V respectively. Next, 2.5V is boosted to 3.3V by the voltage booster circuit 2012. As an end, voltages of 1.8V, 2.5V, and 3.3V can be applied to the GBIC logic circuit 202 as operating voltages of the GBIC logic circuit 202 respectively.

Referring to FIG. 2 again, in the invention the Ethernet switch 1 is implemented as a layer 3 Ethernet switch which is found to comply with one of IEEE802.3 1000Base-X, IEEE802.3 10Base-T, IEEE802.3u 100Base-TX, IEEE802.3z 1000Base-SX/LX, and IEEE802.3ab 1000Base-SX/LX Gigabit Ethernets. The connector 203 is implemented as one of RJ-45 connector, MT-RJ connector, VF-45 connector, and SC connector coupled to a twisted pair line.

While the invention has been described by means of specific embodiments, numerous modifications and variations could be made thereto by those skilled in the art without departing from the scope and spirit of the invention set forth in the claims.

What is claimed is:

1. A method for configuring a GBIC module to an Ethernet switch configured to output different voltages, the GBIC module being coupled to the Ethernet switch, a DC converter of the GBIC module being configured to convert an input voltage supplied by the Ethernet switch into an operating voltage required by a GBIC logic circuit of the GBIC module by performing steps comprising:

lowering the input voltage supplied by the Ethernet switch to a plurality of predetermined voltages lower than the operating voltage of the GBIC logic circuit;

boosting one of the plurality of predetermined voltages to the operating voltage of the GBIC logic circuit; and applying the operating voltage to the GBIC logic circuit of the GBIC module prior to applying to a computer via a connector of the GBIC module.

2. The method of claim 1, wherein the input voltage is in the range of 2.7V to 6.2V.

3. The method of claim 1, wherein the lowered voltages are 2.5V and 1.8V.

4. The method of claim 1, wherein the operating voltage is 3.3V.

5. The method of claim 1, wherein the Ethernet switch is a layer 3 Ethernet switch.

6. An apparatus, comprising:

an Ethernet switch comprising a circuit board including a system power circuit, a system logic circuit, and a GBIC I/F wherein an input voltage from the system power circuit is applied to the GBIC I/F and the system logic circuit is used to send signals received from the Ethernet switch to the GBIC I/F; and a GBIC module coupled to the Ethernet switch, the GBIC module comprising a substrate including a DC converter, a GBIC logic circuit, and a connector wherein the DC converter includes a voltage step-down circuit for lowering the input voltage to a plurality of predetermined voltages lower than the operating voltage of the GBIC module, and a voltage booster circuit for boosting one of the plurality of predetermined voltages to the operating voltage of the GBIC logic circuit, thereby configuring the GBIC module to the coupled Ethernet switch outputting one of a plurality of different voltages.

7. The apparatus of claim 6, wherein the input voltage is in the range of 2.7V to 6.2V.

8. The apparatus of claim 6, wherein the lowered voltages are 2.5V and 1.8V.

9. The apparatus of claim 6, wherein the operating voltage is 3.3V.

10. The apparatus of claim 6, wherein the Ethernet switch is a layer 3 Ethernet switch.

* * * * *